US007796542B2

(12) United States Patent
Siegrist

(10) Patent No.: US 7,796,542 B2
(45) Date of Patent: *Sep. 14, 2010

(54) METHOD AND APPARATUS FOR THE PREVENTION OF UNWANTED CALLS IN A CALLBACK SYSTEM

(75) Inventor: Joseph Siegrist, Vienna, VA (US)

(73) Assignee: Art Technology Group, Inc., Cambridge, MA (US)

( * ) Notice: Subject to any disclaimer, the term of this patent is extended or adjusted under 35 U.S.C. 154(b) by 164 days.

This patent is subject to a terminal disclaimer.

(21) Appl. No.: 11/967,605

(22) Filed: Dec. 31, 2007

(65) Prior Publication Data

US 2009/0010414 A1      Jan. 8, 2009

Related U.S. Application Data

(63) Continuation of application No. 10/655,008, filed on Sep. 5, 2003, now Pat. No. 7,315,518.

(60) Provisional application No. 60/407,941, filed on Sep. 5, 2002.

(51) Int. Cl.
  H04L 12/16    (2006.01)
  H04Q 11/00    (2006.01)
  H04M 3/42     (2006.01)
(52) U.S. Cl. .................. 370/259; 370/352; 379/210.01
(58) Field of Classification Search ................ 370/352, 370/259, 229, 230; 379/142.01, 142.05, 379/142.06, 188, 201.01, 201.11, 210.01, 379/210.02, 210.03
See application file for complete search history.

(56) References Cited

U.S. PATENT DOCUMENTS

| 5,524,145 | A  | 6/1996 | Parker |
| 6,707,811 | B2 | 3/2004 | Greenberg et al. |
| 6,791,974 | B1 | 9/2004 | Greenberg |
| 6,839,414 | B1 | 1/2005 | Enzmann et al. |
| 6,914,899 | B2 | 7/2005 | Siegrist et al. |
| 7,075,921 | B2 | 7/2006 | Siegrist et al. |
| 7,162,019 | B1 | 1/2007 | Mullis et al. |
| 7,203,188 | B1 | 4/2007 | Siegrist et al. |
| 7,315,518 | B1 | 1/2008 | Siegrist |
| 7,367,051 | B1 | 4/2008 | Siegrist et al. |
| 2002/0137490 | A1 | 9/2002 | Gallant |

OTHER PUBLICATIONS

International Search Report from PCT/US2007/080291, mailed Mar. 11, 2008.

*Primary Examiner*—Quoc D Tran
(74) *Attorney, Agent, or Firm*—DLA Piper LLP US

(57) ABSTRACT

In one method and apparatus for blocking unwanted calls in a callback system, parameters associated with a callback request (e.g., the user device to which the call is to be directed, the IP address from which the request originated or an identifier of the source computer from which the callback request originated, the party from whom the call is requested) are tracked for each call. A decision to automatically block the requested callback is made based on one or more criteria based on a combination of these parameters, which may be a total over a period of time. In a second method, one or both of the parties to the callback is queried as to whether the callback is unwanted and, if so, one or more parameters associated with the request are blacklisted.

21 Claims, 2 Drawing Sheets

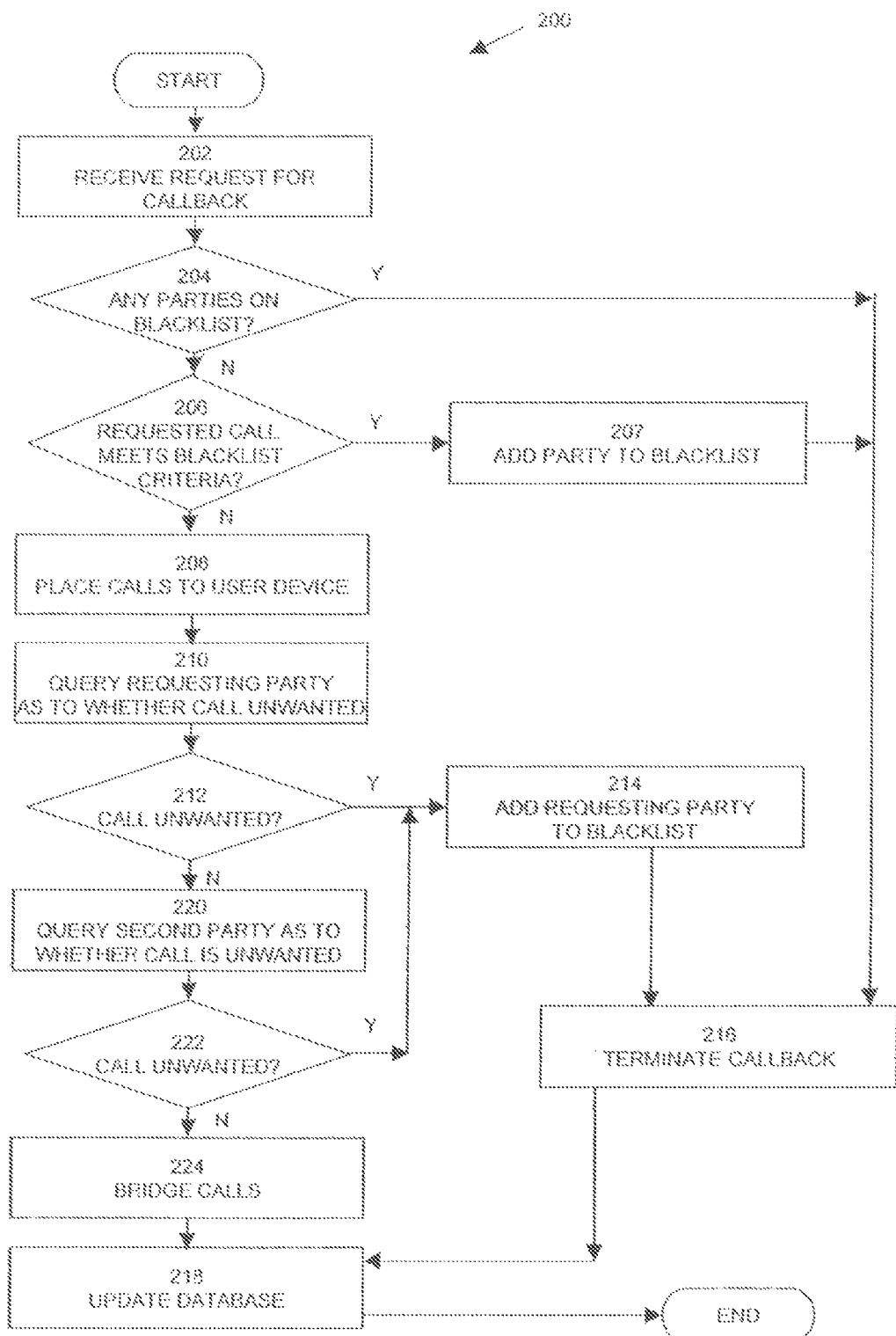

METHOD AND APPARATUS FOR THE PREVENTION OF UNWANTED CALLS IN A CALLBACK SYSTEM

This application is a continuation of U.S. application Ser. No. 10/655,008, filed Sep. 5, 2003, which claims priority from U.S. Provisional Application Ser. No. 60/407,941 filed Sep. 5, 2002. The entireties of all of the aforementioned applications are incorporated herein by reference.

BACKGROUND OF THE INVENTION

1. Field of the Invention

The invention relates to communications systems generally, and more particularly to telephony systems in which a request for a call to a device can be made.

2. Discussion of the Background

The use of the Internet to conduct transactions has become increasingly popular over the last several years. One use of the Internet has been the implementation of callback systems. In general, an Internet callback system allows a user who visits a website to request that some entity associated with the website initiate a call to the user. This call may be a call that is made via user's computer using a VoIP application, but is more commonly a PSTN (public switched telephone network) call made to a PSTN telephone number provided by the user.

A callback service is useful in many different situations, including, but not limited to, e-commerce. For example, the assignee of the present invention, eStara Corp., provides a Push-to-Talk™ service that contains a component known as Phone2Phone™ which allows a user to enter their telephone number into a web page. The eStara Phone2Phone™ service will then automatically place a PSTN call to the telephone number specified by the user and to the web site owner's call center, and then bridge the two calls together to establish a PSTN connection between the user and the retailer. Callback systems can also be implemented with one or both portions of the call employing VoIP technology.

A problem with allowing the user to specify a device (either a PSTN extension or a URL different from the URL from which the user is making the callback request) to which the call is to be made is that it is difficult to verify the authenticity of the data, and users can enter bogus data. This can lead to unwanted calls, e.g., crank calls, where a malicious user makes multiple callback requests for calls to a party who does not desire such calls. Alternatively, a malicious user may harass a particular retailer by making single callback requests for callbacks to devices (e.g., different PSTN extensions or different URLs) corresponding to different requesting parties from the same retailer.

In the past, eStara has used a manual procedure to develop a blacklist to help prevent such calls. In this manual procedure, when a called party recognizes that a received call has not been requested by the calling party, the called party can add the calling party's number to eStara's blacklist by visiting the eStara website and/or sending an email identifying the number to which the unwanted callback was requested (this number is provided to the retailer to allow operation of screen pops of customer-specific information as described in co-pending U.S. patent application Ser. No. 09/771,993 filed Jan. 30, 2001, assigned to eStara, Inc.) This method has the drawback of requiring a manual operation on the part of the called party. Additionally, it is not effective against a malicious user who harasses a particular retailer by making multiple callback requests from different parties to the same retailer.

What is needed is an automated method for preventing unwanted calls that can prevent attacks by malicious users who make multiple callback requests for different user devices.

BRIEF SUMMARY OF THE INVENTION

The present invention addresses the aforementioned issues to a great extent. In one aspect of the invention, one or more parameters of the request, such as the user telephone number or user IP address or URL specified in the request as the party to whom the call is to be placed, the IP address or URL of the source computer from which the callback request originated, an identifier of the source computer from which the callback request originated (such as a unique identifier implemented through a cookie that identifies the device from which the callback request is made), and the party from whom the call is desired, are tracked for each call. A decision to automatically block the requested callback is made based on one or more of the following criteria: (a) a total number of requests received from the source computer during a period of time, (b) a total number of calls resulting from previous requests received from the source computer that are currently in progress, (c) a total number of requests received from the source computer for a call from the second party during a period of time, (d) a total number of requests received from the source computer for a call to the first party during a period of time, and (e) a total number of requests identifying the device of the first party during a period of time. Future callback requests originating from the same IP address/URL and/or bearing the same source computer identifier and/or directed to the same user telephone number can also be blacklisted.

In a second aspect of the invention, the user who receives a callback is provided with an automatic message indicating that they can prevent future calls by taking some action (e.g., pressing a DTMF key). The message can be provided for all calls, or alternatively may be provided only when there is reason to suspect that the call is unwanted. Once the user takes the specified action, the user telephone number and/or the source computer identifier accompanying the callback request and/or the IP address or URL from which the callback request initiated are added to the blacklist to prevent unwanted calls. This second aspect can also be extended to include the provision of the same message to the retailer. This would help in the situation where unwanted callbacks were being requested to a user PSTN extension that simply plays a recording (such as a recorded weather forecast)—once the retailer is connected to the recording, he can take the specified action to have blacklisted the user telephone number corresponding to the recording and/or the identifier of the source computer accompanying the callback request and/or the IP address/URL of the source computer from which the callback request was made.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIG. 2 is a flowchart illustrating a method for preventing unwanted calls according to one embodiment of the present invention.

DETAILED DESCRIPTION

Figure 1:
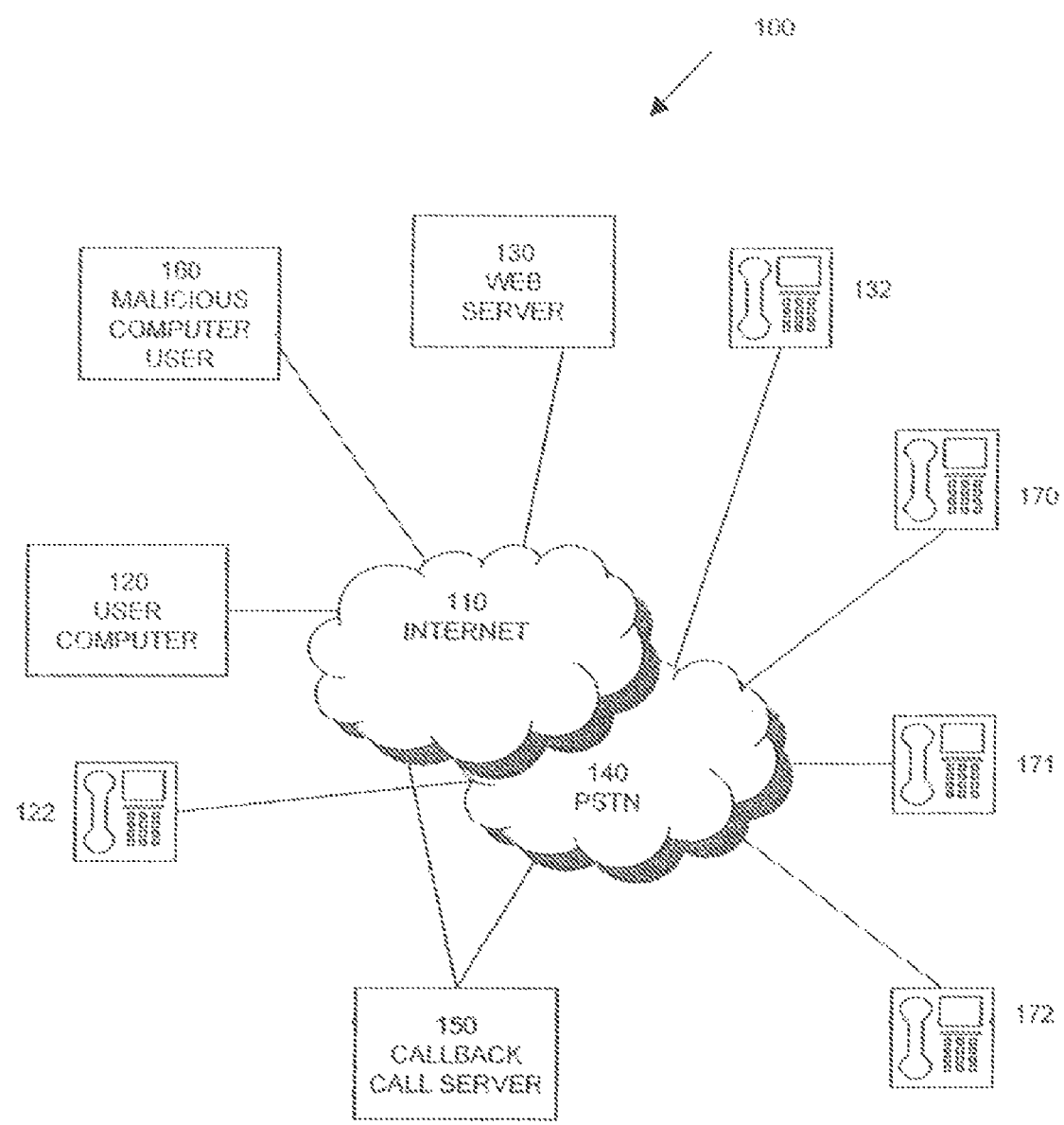
FIG. 1 is a block diagram indicating a system in which the present invention may be implemented.

The present invention will be discussed with reference to preferred embodiments of callback systems. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

An communications system 100 with which the present invention may be practiced is illustrated in FIG. 1. The Internet 110 provides a data connection between a user computer 120 and a web server 130. The user computer may be any type of computer capable of data communication over the Internet 110, and is preferably a personal computer equipped with a world wide web browser. The web server 130 similarly may be any server capable of providing data over the Internet 110, and may be associated with a retailer or any other entity. Both the user computer 120 and the web server 130 may be connected by any means to the Internet 110, including the use of cable or PSTN modems (not shown in FIG. 1), and may be connected in any manner including directly or through an Internet Service Provider (also not shown in FIG. 1).

It should also be recognized that user computer 120 may be connected to the Internet through one or more proxy servers and/or firewalls (not shown in FIG. 1). In such cases, the IP address accompanying a message sent by such a computer through the proxy server(s) and/or firewall(s) to a third party may be the address of a proxy server or firewall rather than the IP address of the computer making the request.

One or more of the web pages provided by web server 130 may include an indication such as an icon or button that the user may use to request a callback from an entity associated with the web server 130 to a device associated with the user. The device may be the user computer 120 or a user PSTN extension 122 associated with the user. Normally, when the call is to be a VoIP call to the user computer 122, the user is not given the option of specifying an IP address/URL and the VoIP call is routed directly to the user computer 122. However, some systems may allow the specification of an alternate IP address or URL for a computer to which the VoIP call will be directed. Upon activating the icon/button, the user is prompted to specify a device (PSTN extension or, in some systems, IP address or URL) at which the callback is desired.

A callback request message is then transmitted from the user computer 120 to a callback call server 150. The call server 150 may be a single device or may represent a plurality of physically separate devices that together comprise a callback system. For example, the call server 150 may comprise a server connected to a conventional telephone switch in the case where a PSTN-PSTN callback is desired, and/or an IP-to-PSTN gateway where one of the legs of the callback is to be a VoIP call. Exemplary callback systems are described in the aforementioned U.S. patent application Ser. No. 09/771,993, filed Jan. 30, 2001, entitled "Internet Telephony for Ecommerce", the contents of which are hereby incorporated by reference herein. In multiple component embodiments, the various components of the callback server 150 may be connected to each other via the Internet 110 or by a private network. Additionally, data communications between the user computer 120 and the various components of the call server 150 may take place directly or may be funneled through a single device. It should also be recognized that the functions performed by the call server 150 and the web server 130 may be integrated into a single device or may be separate devices.

The callback call server 150 begins the process by placing a first call to the device specified by the user, over either the Internet 110 or the PSTN 140 (or some combination of the two). The callback service provider 150 then places a second call to a device associated with the web server 130, again over the Internet 110, the PSTN 140, or some combination of the two. By arrangement with the web site owner operating the web server 130, the device may be the web server 130 itself (or some other server associated with the retailer), or may be a PSTN extension 132 associated with the web site owner. It is also possible to place the call to the call to the device associated with the web server 130 first, then place the call to the device associated with the user computer 120, and bridge the two calls.

As discussed above, this arrangement is subject to malicious use by a user. For example, a malicious user on malicious user computer 160 may request a plurality of callbacks from web server 130, specifying the PSTN extension 122 associated with user computer 120 to harass the user associated with the user computer 120 and PSTN extension 122. Alternatively, the malicious user may harass the retailer associated with the web server 130 by requesting callbacks to a plurality of PSTN extensions 170-172 associated with third parties who do not desire callbacks.

A method for preventing such malicious activity is illustrated in the flowchart 200 of FIG. 2. The method starts when a callback request is received at callback call server 150 at step 202. The source computer from which the request originated and the information identifying the device to which the request is directed are checked against blacklist at step 204. If either the source computer or the device to which the request is directed is on the blacklist at step 204, the callback is terminated at step 216, the database is updated at step 218, and the process ends.

If neither the source computer nor the device to which the request is directed is on the blacklist at step 204, a database of past and present call activity for the source computer and device to which the request is directed is consulted to determine whether the callback request meets any blacklist criteria at step 206.

There are a number of different criteria that may be used to determine whether a call has been blacklisted. One criteria that may be used is the total number of requests received from the source from which current request originated during a period of time (e.g., the past 24 hours). One way in which the source can be identified is through the IP address or URL. However, as discussed above, the IP address/URL associated with the request may not be the true IP address/URL associated with the user computer 120 from which the request is actually made. Thus, in alternative embodiments, the software on the user computer 120 (which is typically an applet downloaded to the user computer 120 from the web server 130) may include in the request an identifier of the user computer 120 which is used by the call server 150 to identify the source of the callback request.

One example of an identifier is the GUID, which is an anonymous identifier created by the guid.org service (which is performed by an independent organization not associated with the applicant) that is stored on the browser in a cookie and is unique to a user computer 120. More information about the GUID can be obtained by visiting www.guid.org. A GUID can also be created by any entity in a manner well known in the art. Thus, the GUID can be the GUID assigned by guid.org, or can be a GUID created on the user computer 120 by an entity involved in processing the call request during the process of and/or for the purpose of servicing the call request. Alternatively, the identifier may comprise a combination of the IP address and the user agent (which identifies the browser (e.g., Microsoft Internet Explorer 5.5), the operating system (e.g., Windows NT 4.0), and any installed browser plug-ins or hot fixes). This identifier is not unique in that it is possible to have two user computers 120 configured with the exact same operating system, browser, browser plugins and hot fixes, operating behind a firewall and thus appearing to have the same IP address/URL. However, this identifier is better than simply using the IP address/URL alone. It should be understood that the invention may be practiced with a wide variety of identifiers, including those that exist now and those that may be developed later. The identifiers may be associated with software on the computer, with components of the computer itself (e.g., MAC address), or by various commercial or non-profit schemes to identify devices and their users (e.g., Microsoft Passport, GUID, etc.).

Another criteria that may be used is the number of callback calls currently in progress that result from a request from the same IP address/URL or bearing the same identifier. No user should request more than one call at a time. Therefore, in some embodiments, no callback request is allowed if there is a single in-progress callback resulting from a request from the same IP address/URL or bearing the same identifier. However, in some embodiments, the threshold is set to 2 in order to account for situations in which a user mistakenly (rather than maliciously) requests a second callback.

Yet other criteria are (i) a total number of requests received from the source computer for a call from the second party during a period of time, (ii) a total number of requests received from the source computer for a call to the first party during a period of time, and (iii) a total number of requests identifying the device of the first party (regardless of the identity of the source computer) during a period of time. Again, for criteria (i), the source computer may be identified using either the IP address/URL or an identifier accompanying the request.

If any of the blacklist criteria are met at step 206, one or more of the parties associated with the request are added to the blacklist at step 207. The party or party added to the blacklist depends upon the criteria that has been met. For example, if the same source computer has exceeded the maximum allowable number of requests in the relevant period, that source computer is added to the blacklist. Likewise, if the total number of callback requests directed toward a single user device exceeds a threshold in a relevant period, the user device is added to the blacklist. The source computer may also be added to the blacklist in this situation, even if previous callback requests originated from a different source computer. The selection of a party or parties to blacklist is flexible. After the party is added to the blacklist at step 207, the callback is terminated at step 216, the database is updated at step 218, and the process ends.

If the requested call does not meet any blacklist criteria at step 206, the call server 150 places a call to the user device specified in the request at step 208. As discussed above, this call may be a PSTN or VoIP call. Once this first call is answered, the call server queries the answering party as to whether this callback is unwanted at step 210.

When the call to the user device is to a PSTN extension, the answering party may be prompted to use a particular key on the keypad (e.g., "press # if you did not request this call) to indicate that the call is unwanted. In some embodiments, when the call to user device is a VoIP call, the user is not queried as to whether the call is desired because, as discussed above, the call is automatically routed to the IP address/URL from which the request issued. However, the user may be prompted in the context of a VoIP call in some embodiments for two reasons: (1) as discussed above, some callback systems allow the specification of an IP address/URL for the VoIP phone call different from the IP address/URL from which the request issued, and (2) for some reason (e.g., address spoofing by a malicious individual), the IP address/URL accompanying the request does not correspond to the actual IP address/URL of the computer from which the request was issued. It is also conceivable that a skilled hacker could figure out how callback request packets are structured and create bogus requests (or scripts that create bogus requests, as in a denial of service attack), bypassing the application that generates the request (which is usually placed on the user computer 120 and controlled by an entity that is providing the callback service.) These bogus requests may be of either the PSTN or VoIP varieties. In such embodiments, an icon or button may be downloaded to the computer to which the VoIP call is directed so that the user can indicate that blacklisting is desired.

If the party indicates that the call is unwanted at step 212, the user computer that made the request is added to the blacklist at step 214. In some embodiments, this is accomplished by adding the IP address/URL from which the request was received to the blacklist. Alternatively, or in addition to the IP address/URL, the identifier accompanying the request is added to the blacklist. As discussed above, the identifier may be, for example, a unique identifier of the GUID type or a pseudo-unique identifier such as a combination of the IP address/URL and the user agent. In some embodiments, the user device to which the call was directed is also added to the blacklist. However, this may be problematic in that an innocent user to whom a malicious individual directed a crank call may become blacklisted and thus unable to receive calls legitimately requested by the innocent user. Thus, in some embodiments, the blacklisting of the user device is only for a limited time. In other embodiments, only callback requests from a user computer that issued the request to the user device are blacklisted so that the user device can continue to receive calls when the request issues from another (presumably the user's) computer.

After the blacklisting is performed at step 214, the callback is terminated at step 216, the call database is updated to add the requesting computer and the first party to the corresponding totals at step 218, and the process ends.

If the first party does not indicate that the call was unwanted at step 212, some embodiments of the invention query the second party as to whether the call is unwanted at step 220. This is done to cover situations in which a malicious individual directs callbacks to user PSTN extensions that will not respond to a query indicating that the call was unwanted, such as PSTN extensions that simply play a recording (such as a recorded weather forecast). If the second party indicates that the call was unwanted at step 222, steps 214, 216 and 218 are repeated. If the second party does not indicate that the call is unwanted at step 224, the first and second calls are bridged at step 224 and the database is updated at step 218.

It should be noted that the various aspects of the invention discussed above may be practiced separately or together. For example, the aspect of the invention directed toward maintaining a database of call totals and automatically blocking calls when a criteria is met may be practiced with or without the aspect directed toward adding one or more parties associated to the request to a blacklist upon the criteria being met. Similarly, the aforementioned aspects may be practiced with or without the aspect of the invention directed toward querying parties as to whether a call is unwanted and adding the requesting computer and/or the user device to the blacklist if an unwanted indication is received. Similarly, the invention may be practiced with a query as to whether the call is unwanted to only the first party to the call, or may be practiced with queries to both parties.

It should also be noted that the blacklisting discussed above may be permanent or temporary. Additionally, in some embodiments of the invention, a blacklisted party is notified of the blacklisting and given the opportunity to request removal from the blacklist. This may be accomplished electronically (e.g., via email), by telephone, or by written communication.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed is:

1. A computerized method for processing a request for a call comprising the steps of:
   receiving by a call server via a packet switched network a request from a first party for a call from a second party to the first party, the request including information sufficient to identify a device associated with the first party who wishes to receive the call, the request originating from a source computer;
   making a determination whether a total number of requests received from the source computer during a period of time exceeds a threshold; and
   connecting the first party to the second party or blocking the request based on the determination.

2. The method of claim 1, further comprising the step of adding at least one parameter associated with the request to a blacklist.

3. A method for processing a request for a call comprising the steps of:
   receiving by a call server via a packet switched network a request from a first party for a call from a second party to the first party, the request including information sufficient to identify a device associated with the first party who wishes to receive the call, the request originating from a source computer;
   making a determination whether a total number of requests received from the source computer for a call from the second party during a period of time exceeds a threshold; and
   connecting the first party to the second party or blocking the request based on the determination.

4. The method of claim 3, further comprising the step of adding at least one parameter associated with the request to a blacklist.

5. A method for processing a request for a call comprising the steps of:
   receiving by a call server via a packet switched network a request from a first party for a call from a second party to the first party, the request including information sufficient to identify a device associated with the first party who wishes to receive the call, the request originating from a source computer;
   making a determination whether a total number of requests received from the source computer for a call to the first party during a period of time exceeds a threshold; and
   connecting the first party to the second party or blocking the request based on the determination.

6. The method of claim 5, further comprising the step of adding at least one parameter associated with the request to a blacklist.

7. The method of claim 5, wherein a source computer identifier is used to associate requests with a source computer.

8. The method of claim 7, wherein the request includes the source computer identifier.

9. The method of claim 7, wherein the source computer identifier is a unique identifier.

10. The method of claim 7, wherein the source computer identifier is based at least in part on a user agent that depends on an operating system, a browser, and any browser plug-ins or hot fixes installed on the source computer.

11. The method of claim 7, wherein the source computer identifier is associated with a component of the computer.

12. The method of claim 1, wherein a source computer identifier is used to associate requests with a source computer.

13. The method of claim 12, wherein the request includes the source computer identifier.

14. The method of claim 12, wherein the source computer identifier is a unique identifier.

15. The method of claim 12, wherein the source computer identifier is based at least in part on a user agent that depends on an operating system, a browser, and any browser plug-ins or hot fixes installed on the source computer.

16. The method of claim 12, wherein the source computer identifier is associated with a component of the computer.

17. The method of claim 3, wherein a source computer identifier is used to associate requests with a source computer.

18. The method of claim 17, wherein the request includes the source computer identifier.

19. The method of claim 17, wherein the source computer identifier is a unique identifier.

20. The method of claim 17, wherein the source computer identifier is based at least in part on a user agent that depends on an operating system, a browser, and any browser plug-ins or hot fixes installed on the source computer.

21. The method of claim 17, wherein the source computer identifier is associated with a component of the computer.

* * * * *